United States Patent [19]

Warzelhan et al.

[11] Patent Number: 4,864,005
[45] Date of Patent: * Sep. 5, 1989

[54] PREPARATION OF HOMOPOLYMERS AND COPOLYMERS OF α-MONOOLEFINS USING A ZIEGLER CATALYST SYSTEM

[75] Inventors: Volker Warzelhan, Weisenheim; Wolfgang Ball, Mannheim; Robert Bachl, Worms, all of Fed. Rep. of Germany

[73] Assignee: BASF Aktiengesellschaft, Ludwigshafen, Fed. Rep. of Germany

[*] Notice: The portion of the term of this patent subsequent to Jun. 25, 2002 has been disclaimed.

[21] Appl. No.: 548,447

[22] Filed: Nov. 3, 1983

[30] Foreign Application Priority Data

Nov. 13, 1982 [DE] Fed. Rep. of Germany ....... 3242150

[51] Int. Cl.$^4$ ............................. C08F 4/64; C08F 10/00
[52] U.S. Cl. ..................................... 526/116; 502/113; 526/114; 526/129; 526/348.5; 526/352
[58] Field of Search ......................... 526/114, 116, 129

[56] References Cited

U.S. PATENT DOCUMENTS

| 3,678,025 | 7/1972 | Binell ................................. 526/114 |
| 4,154,701 | 5/1979 | Milquist ............................. 526/116 |
| 4,368,305 | 1/1983 | Tanaka et al. ...................... 526/114 |

FOREIGN PATENT DOCUMENTS

| 78996 | 5/1983 | European Pat. Off. ............ 526/129 |
| 2831828 | 2/1980 | Fed. Rep. of Germany . |
| 1582287 | 1/1981 | United Kingdom . |
| 1601418 | 10/1981 | United Kingdom . |

Primary Examiner—Edward J. Smith
Attorney, Agent, or Firm—Oblon, Spivak, McClelland, Maier & Neustadt

[57] ABSTRACT

A process for the preparation of homopolymers and copolymers of α-monoolefins by polymerization of the monomer or monomers using a Ziegler catalyst system comprising (1) a transition metal catalyst component and (2) an organoaluminum catalyst component, in which the transition metal catalyst component (1) employed is a solid-phase product (VI) obtained by (1.1) first bringing (1.1.1) a finely divided, porous, inorganic oxidic substance (I) as the carrier, and (1.1.2) a solution (II), as obtained on combining (IIa) an alcohol and (IIb) a transition metal composition, into contact with one another to form a suspension (III), evaporating this suspension to dryness (formation of a solid-phase intermediate (IV)) and (1.2) then (1.2.1) bringing the solid-phase intermediate (IV) obtained from stage (1.1), and (1.2.2) a solution of an organoaluminum compound (V) in an organic solvent, into contact with one another to form a suspension, the resulting suspended solid-phase product (VI) being transition metal catalyst component (1), wherein the transition metal catalyst component (1) employed in a solid-phase product (VI) obtained using a transition metal composition (IIb) comprising (IIb1) a vanadium trihalide, (IIb2) a titanium trihalide and (IIb3) a zirconium tetrahalide.

2 Claims, No Drawings

PREPARATION OF HOMOPOLYMERS AND COPOLYMERS OF α-MONOOLEFINS USING A ZIEGLER CATALYST SYSTEM

The present invention relates to a process for the preparation of homopolymers and copolymers of $C_2$–$C_8$-α-monoolefins, in particular of ethylene, by polymerization of the monomer or monomers at from 30 to 200° C., in particular from 50 to 125° C., and under a pressure of from 0.1 to 200, in particular from 5 to 60, bar, using a Ziegler catalyst system comprising (1) a transition metal catalyst component and
(2) an organoaluminum catalyst component of the formula $$ALR_mX_{3-m}$$

where X is a radical OR, chlorine, bromine or hydrogen, preferably a radical OR or chlorine, R is a $C_1$–$C_{18}$-hydrocarbon radical, in particular $C_1$–$C_{12}$-alkyl, preferably $C_2$–$C_8$-alkyl, and m is a number from 1 to 3, preferably from 2 to 3, with the provisos (i) that the atomic ratio of the transition metal from the catalyst component (1) to aluminum from component (2) is from 1:0.1 to 1:500, preferably from 1:0.2 to 1:200, and (ii) that the transition metal catalyst component (1) used in a solid-phase product (VI), obtained by a method in which first a finely divided, porous, inorganic oxidic substance (I), which has a particle diameter of from 1 to 1,000, preferably from 1 to 400, μm, a pore volume of from 0.3 to 3, preferably from 1 to 2.5, cm³/g and a specific surface area of from 100 to 1,000, preferably from 200 to 400, m²/g and is of the formula $SiO_2.aAl_2O_3$ where a is a number from 0 to 2, in particular from 0 to 0.5, and (1.1.2) a solution (II), as obtained on combining (IIa) 100 parts by weight of an alcohol of the formula $$Z—OH$$

where Z is a saturated $C_1$–$C_8$-hydrocarbon radical, in particular a saturated $C_1$–$C_6$-hydrocarbon radical, preferably $C_1$–$C_4$-alkyl, and from 0.01 to 40, preferably from 1 to 25, parts by weight of a transition metal composition, are brought into contact with one another to form a suspension (III), with the proviso that the weight ratio of inorganic oxidic substance (I) to transition metal composition (IIb) is from 1:0.01 to 1:1.2, preferably from 1:0.2 to 1:0.8, the suspension (III) is evaporated to dryness at below 200° C., preferably below 160° C., and above the melting point of the alcohol (IIa) used, a solid-phase intermediate (IV) being formed, and thereafter the solid-phase intermediate (IV) obtained from stage (1.1) and a solution, in an organic solvent, of an aluminum compound (V) of the formula $$ALR_mX_{3-m}$$

where X is a radical OR, chlorine, bromine or hydrogen, preferably a radical OR or chlorine, R is a $C_1$–$C_{18}$-hydrocarbon radical, in particular $C_1$–$C_{12}$-alkyl, preferably $C_2$–$C_8$-alkyl, and m is a number from 1 to 3, preferably from 2 to 3, are brought into contact with one another to form a suspension, with the proviso that the weight ratio of the solid-phase intermediate (IV) to the aluminum compound (V) is from 1:0.05 to 1:2, preferably from 1:01 to 1:1, and the resulting suspended solid-phase product (IV) is the transition metal catalyst component (1).

Polymerization processes of this type are known, and the process described in British Patent 1,601,418 may be considered to be representative in the present case.

The central feature of the stated method, as in other parallel methods, is the special embodiment of transition metal catalyst component (1).

It is known that special embodiments of the transition metal catalyst component are produced in order to achieve certain aims, such as the following: (a) catalyst systems which are capable of giving a high yield of polymer, ie. catalyst systems with a high productivity, ie. systems in which the amount of polymer formed by unit weight of the catalyst component (1) is increased.

(b) Catalyst systems which introduce less halogen, if any, into the polymer; this can be achieved by
  (b₁) increasing the yield as described in (a) and/or
  (b₂) using transition metal catalyst components which contain very little or no halogen.

(c) Catalyst systems which display their advantageous actions even at relatively low temperatures; this may be important, for example, for dry-phase polymerization.

(d) Catalyst systems which influence the morphological properties of the polymers in a certain way, for example giving uniform particle size and/or reducing the fraction of very fine particles and/or giving a high bulk density; this may be important with regard to mastering the polymerization systems technically and working up the polymers and/or for the processability of the polymers.

(e) Catalysts systems which can be simply and reliably prepared and are easy to handle, for example those which can be prepared in an inert hydrocarbon medium.

(f) Catalyst systems which make it possible to manage with a relatively small amount of regulator in polymerizations in the presence of molecular weight regulators, such as hydrogen; this may be important, for example, for the thermodynamics of the procedure.

(g) Catalyst systems which permit the production of polymers having particularly pronounced stress cracking resistance, a property which is particular important, for example, for liquid containers, ie. containers in which corrosive liquids are to be stored.

(h) Catalyst systems tailored to special polymerization processes, for example those which are adapted either to the specific features of suspension polymerization or to the specific features of dry-phase polymerization.

(i) Catalyst systems giving polymers which on the one hand have a high molecular weight (strong finished product) and on the other hand can be processed without problems, ie. high molecular weight polymers which can be relatively rapidly processed to give satisfactory shaped articles, even when relatively low processing temperatures and/or relatively weak processing forces are used.

(j) Catalyst systems which give polymers having particularly high rigidity; this property is desirable for many fields of use.

From experience to date, there are, among the various aims, some which can be achieved by means of particular embodiments of the transition metal catalyst component only if other aims are neglected.

Under these circumstances, it is generally desirable to find those embodiments which not only allow the selected aims to be achieved but also result in other desirable aims being neglected as little as possible.

It is an object of the present invention to provide a novel type of transition metal catalyst component, by means of which, with similar aims, better results can be achieved compared with conventional transition metal catalyst components, particularly with regard to the abovementioned aim (g), which should be achieved to a very high degree while at the same time aims (i) and (j) are achieved satisfactorily and aim (a) is neglected as little as possible.

We have found that this object is achieved by means of a transition metal catalyst component (1) of the type described at the outset, in which the three transition metals, vanadium, titanium and zirconium, are present together in a certain manner.

The present invention accordingly relates to a process for the preparation of homopolymers and copolymers of $C_2$–$C_8$-α-monoolefins, in particular of ethylene, by polymerization of the monomer or monomers at from 30 to 200° C., in particular from 50° to 125° C., and under a pressure of from 0.1 to 200, in particular from 5 to 60, bar, using a Ziegler catalyst system comprising (1) a transition metal catalyst component and (2) an organoaluminum catalyst component of the formula $$ALR_mX_{3-m}$$

where X is a radical OR, chlorine, bromine or hydrogen, preferably a radical OR or chlorine, R is a $C_1$–$C_{18}$-hydrocarbon radical, in particular $C_1$–$C_{12}$-alkyl, preferably $C_2$–$C_8$-alkyl, and m is a number from 1 to 3, preferably from 2 to 3, with the provisos (i) that the atomic ratio of the transition metal from the catalyst component (1) to aluminum from catalyst component (2) is from 1:0.1 to 1:500, preferably from 1:0.2 to 1:200, and (ii) that the transition metal catalyst component (1) is a solid-phase produce (VI), obtained by a method in which first a finely divided, porous, inorganic oxidic substance (I), which has a particle diameter of from 1 to 1,000, preferably from 1 to 400, μm, a pore volume of from 0.3 to 3, preferably from 1 to 2.5, cm³/g and a specific surface area of from 100 to 1,000, preferably from 200 to 400, m²/g and is of the formula $SiO_2.aAl_2O_3$ where a is a number from 0 to 2, in particular from 0 to 0.5, and (1.1.2) a solution (II), as obtained on combining (IIa) 100 parts by weight of an alcohol of the formula $$Z\text{—}OH$$

where Z is a saturated $C_1$–$C_8$-hydrocarbon radical, in particular a saturated $C_1$–$C_6$-hydrocarbon radical, preferably $C_1$–$C_4$-alkyl, and (IIb) from 0.01 to 40, preferably from 1 to 25, parts by weight of a transition metal composition, are brought into contact with one another to form a suspension (III), with the proviso that the weight ratio of inorganic oxidic substance (I) to transition metal composition (IIb) is from 1:0.01 to 1:1.2, preferably from 1:0.2 to 1:0.8, the suspension (III) is evaporated to dryness at below 200° C., preferably below 160° C., and above the melting point of the alcohol (IIa) used, a solid-phase intermediate (IV) being formed, and thereafter the solid-phase intermediate (IV) obtained from state (1.1) and (1.2.2) a solution, in an organic solvent, of an aluminum compound (V) of the formula $$ALR_mX_{3-m}$$

where X is a radical OR, chlorine, bromine or hydrogen, preferably a radical OR or chlorine, R is a $C_1$–$C_{18}$-hydrocarbon radical, in particular $C_1$–$C_{12}$-alkyl, preferably $C_2$–$C_8$-alkyl, and m is a number from 1 to 3, preferably from 2 to 3 are brought into contact with one another to form a suspension, with the proviso that the weight ratio of the solid-phase intermediate (IV) to the aluminum compound (V) is from 1:0.05 to 1:2, preferably from 1:0.1 to 1:1, and the resulting suspended solid-phase produce (VI) is the transition metal catalyst component (1).

In the novel process, the transition metal catalyst component (1) employed is a solid-phase product (VI) obtained using a transition metal composition (IIb) comprising (IIb1) 100 molar parts of a vanadium trihalide in which the halogen can be chlorine and/or bromine, preferably of a vandium trichloride, (IIb2) from 0.5 to 300, preferably from 1 to 100, molar parts of a titanium trihalide in which the halogen can be chlorine and/or bromine, preferably of a titanium trichloride and (IIb3) from 5 to 400, preferably from 20 to 200, molar parts of a zirconium tetrahalide in which the halogen can be chlorine and/or bromine, preferably of a zirconium tetrachloride.

Regarding the novel process, the following may be stated specifically:

Provided that the characteristic features are taken into account, the polymerization process as such can be carried out in virtually any relevant conventional technological embodiment, for example suspension polymerization, solution polymerization or dry-phase polymerization by a batchwise, semi-continuous or continuous procedure. The technological embodiments mentioned, ie. the technological variants of the Ziegler polymerization of olefins, are well known from the literature and in practice, so that a more detailed description of this is unnecessary here. However, it should be stated that the novel transition metal catalyst component (1), like corresponding conventional catalyst components, can, for example, be combined with the catalyst component (2) either outside or inside the polymerization vessel, in the latter case, for example, by introducing the components at separate points; the components are otherwise handled in the form of a suspension (catalyst component (1)) or of a solution (catalyst component (2)). It is also possible, for example, to employ catalyst component (1), or the combined catalyst components (1) and (2), in the form of particles which are provided with a wax covering; this method may be advantageous in the dry-phase polymerization process.

Regarding the novel transition metal catalyst component (1) itself, the following may be stated:

It is prepared in two stages which are denoted by (1.1) and (1.2) above and below.

In stage (1.1) a finely divided inorganic oxidic substance (I) of the type defined above is brought into contact with a particular solution (II) defined above, and the resulting suspension (III) is evaporated to dryness (formation of a solid-phase intermediate (IV)). In state (1.2), the latter is brought into contact with a solution of a particular aluminum compound (V) defined above, a suspension once again being formed; the resulting suspended solid-phase product (VI) is the novel catalyst component (1).

Specifically, the procedure is as follows: Stage (1.1)

The inorganic oxidic substance (I) as such or suspended in an alcohol (advantageously an alcohol as defined under (IIa), the suspension containing not less than 5% by weight of solids) is combined with the solution (II), and the resulting suspension (III) is then evaporated down.

The preparation of solution (II) itself can be carried out in a conventional manner, and to this extent no special features are involved.

As a final measure in state (1.1), the suspension (III) is evaporated to dryness, the solid-phase intermediate (IV) being obtained. This procedure can be carried out, while maintaining the above temperature conditions, by a conventional method for evaporating down suspensions under mild conditions. This means that it is generally advantageous (and may be absolutely necessary in the case of relatively high molecular weight alcohols (IIa)) to carry out the evaporation under more or less greatly reduced pressure. As a general rule, the combination of temperature and pressure is chosen so that the evaporation process is complete after about 1–10 hours. It is also advantageous to carry out the evaporation while continuously keeping the treated material homogeneous; for example, rotary evaporators have proved useful for this purpose. A residual amount of alcohol, for example an amount bound as a result of complex formation, generally does not have an adverse effect on the solid-phase intermediate (IV). Stage (1.2)

First, a 0.1–40, preferably about 20, per cent strength by weight suspension on the solid-phase intermediate (IV) and a 5–80, preferably about 20, per cent by weight solution of the aluminum compound (V) are prepared separately, particularly suitable suspending agents or solvents being hydrocarbons, especially relatively low-boiling alkane hydrocarbons, eg. hexane, heptane or gasoline. The suspension and the solution are then combined in amounts such that the desired weight ratio is obtained. This combination is generally carried out by introducing the solution into the stirred suspension, since this procedure is more practical than the converse one, which is also possible. At from −25° to 120° C., in particular from 25° to 80° C., formation of the solid-phase product (VI), which is present in suspension, is complete within from 15 to 600, in particular from 60 to 300, minutes. This product, advantageously directly in the form of the resulting suspension and, if necessary, after being washed by digestion, can be used as the transition metal catalyst component (1). If desired, however, it is also possible first to isolate the solid-phase product (VI) and then to use it as catalyst component (1); isolation can be effected, for example, by the following method: the product (VI) is separated from the liquid phase by filtration, is washed with pure liquid (for example of the type also used as the suspending agent or solvent) and is then dried, for example under reduced pressure.

The novel transition metal catalysts (1), ie. the solid-phase products (VI), can be employed in the process, defined at the outset, for the preparation of the polymers mentioned there, the procedure used being a conventional one for transition metal catalyst components in the Ziegler polymerization of α-monoolefins. To this extent, therefore, the novel process does not involve any special features, and reference may be made to the methods of use which are well known from the literature and in practice. It should merely be stated that the process is mainly suitable for the preparation of homopolymers and copolymers of ethylene, and that, in the case of the preparation of copolymers of ethylene with higher α-monoolefins (or of the preparation of homopolymers and copolymers of higher α-monoolefins), particularly suitable α-monoolefins are but-1-ene and hex-1-ene. The molecular weights of the polymers can be regulated in a relevant conventional manner, in particular using hydrogen as a regulator.

Regarding the composition of the novel transition metal catalysts (1), the following may be stated specifically:

The inorganic oxidic substance (I) employed in stage (1.1) is generally an aluminosilicate or, in particular, a silicon dioxide; it is important that it possesses the properties required. We have found that particularly useful substances (I) are those obtained by the first stage (1) of the process described in British Patent 1,550,951, particularly if hydrogels as obtained in the preliminary stages (A) to (D) described in the said patent are used as starting materials, ie. hydrogels obtainable by the process described in British Patent 1,368,711.

Examples of suitable alcohols (IIa) are methanol, ethanol, propanols and butanols, and, for example, methanol, ethanol, isopropanol and-n-butanol have been found to be particularly useful. The alcohols (IIa) can be employed in the form of individual compounds or as mixtures of two or more individual compounds.

The vanadium trihalide (IIb1) used can be one which is connectionally employed in Ziegler catalyst systems.

The titanium trihalide (IIb2) used can also be one which is conventionally used in Ziegler catalyst systems, for example a product obtained in the reduction of a titanium tetrahalide by means of hydrogen, aluminum or an organoaluminum compound. Compounds which have been found to be particularly useful are, for example, trichlorides of the formula $TiCl_3$, as obtained in the reduction of titanium tetrachloride with hydrogen, and trichlorides of the formula $TiCl_3.1/3\ AlCl_3$ as obtained in the reduction of titanium tetrachloride by means of metallic aluminum. The titanium trihalides can be employed in the form of an individual compound or as mixtures of two or more individual compounds.

The zirconium tetrahalide (IIb3) used can likewise be one which is conventionally employed in Ziegler catalyst systems.

The aluminum compound (V) used in stage (1.2) can be, for example, a compound of the formula $Al(C_2H_5)_3$, $Al(C_2H_5)_2Cl$, $AlC_2H_5)_2Br$, $Al(C_2H_5)_{1.5}Cl_{1.5}$, $Al(C_2H_5)_{1.5}Br_{1.5}$, $Al(C_2H_5)Cl_2$, $Al(C_2H_5)Br_2$, $Al(C_4H_9)_3$, $Al(C_4H_9)_2Cl$, $Al(C_4H_9)Cl_2$, $Al(C_2H_5)_2H$, $Al(C_4H_9)_2H$, $Al(C_3H_7)_2(OC_3H_7)$ or $Al(C_2H_5)_{1.5}(OC_2H_5)_{1.5}$, or isoprenyl-aluminum, We have found that aluminum compounds of the formulae $C_2H_5AlCl_2$ and $(C_2H_5)_2AlCl$, and isoprenyl-aluminum, are particularly useful.

The aluminum compounds (V) can be employed in the form of individual compounds or as mixtures of two or more individual compounds.

Suitable organoaluminum catalyst components (2) are the relevant conventional compounds; examples of suitable individual compounds are those of the formulae $Al(C_2H_5)_3$, $Al(i-C_4H_9)_3$ and $Al(C_8H_{17})_3$, and isoprenyl-aluminum.

Finally, it should furthermore be noted that the novel transition metal catalyst components (1), ie. the products (VI), are sensitive to hydrolysis and oxidation. Hence, in handling these substances, the relevant conventional safety meausres for Ziegler catalysts (eg. ab-

EXAMPLE 1

Preparation of the transition metal catalyst component (1): Stage (1.1)

The starting materials used were (1.1.1) 12.5 parts by weight of silicon dioxide ($SiO_2$, particle diameter 40–150 μm, pore volume: 1.7 cm$^3$/g, specific surface area: 430 m$^2$/g) and (1.1.2) a solution of 100 parts by weight of methanol and 10 parts by weight of a transition metal composition consisting of 100 molar parts of vanadium trichloride, 6 molar parts of a titanium trihalide of the formula $TiCl_3.1/3\ AlCl_3$ and 34 molar parts of zirconium tetrachloride. These two components were combined, and the resulting suspension was stirred for a short time. Thereafter, the solid-phase intermediate (IV) formed was isolated by stripping off the volatile constituents in a rotary evaporator brought to an operating pressure of 15 mbar and an operating temperature of 55° C.

Stage (1.2)

10 parts by weight of the solid-phase intermediate (IV) obtained in stage (1.1) were suspended in 50 parts by weight of n-heptane, a solution of 5 parts by weight of diethyl-aluminum chloride in 20 parts by weight of n-heptane was added to this suspension, and the resulting suspension was stirred for a short time at 50° C. The suspension was then filtered, and the residue was washed three times with n-heptane and dried under reduced pressure. Analysis of the resulting solid-phase product (VI), ie. the catalyst component (1), showed that it contained 0.002 mole of transition metals per g.

Polymerization:

10 parts by weight of the transition metal catalyst component (1) (corresponding to 1 molar part of transition metals) were suspended in 3,000 parts by weight of n-heptane. The resulting suspension was introduced into a stirred autoclave which was charged with 70,000 parts by weight (corresponding to about 50% of its capacity) of n-heptane and 120 parts by weight of triisobutylaluminum (2) ( corresponding to 30 molar parts). Polymerization was then carried out, while stirring, under the following conditions, which were kept constant by controlling them: ethylene pressure =25 bar, hydrogen pressure =4 bar and temperature =95° C. The polymerization was continued for 1.5 hours, after which it was terminated by letting down the pressure in the autoclave.

In this manner, a polymer was obtained which had high rigidity, good processability and high stress cracking resistance, the productivity being satisfactory.

EXAMPLE 2

Preparation of the transition metal catalyst component (1): Stage (1.1)

The starting materials used were (1.1.1) 12.5 parts by weight of silicon dioxide ($SiO_2$, particle diameter 40–150 μm, pore volume: 1.7 cm$^3$/g, specific surface area: 430 M$^2$/g) and (1.1.2) a solution of 100 parts by weight of methanol and 10.5 parts by weight of a transition metal composition consisting of 100 molar parts of vanadium trichloride, 8 molar parts of a titanium trihalide of the formula $TiCl_3.1/3\ AlCl_3$ and 67 molar parts of zirconium tetrachloride. These two components were combined, and the resulting suspension was stirred for a short time. Thereafter, the solid-phase intermediate (IV) formed was isolated by stripping off the volatile constituents in a rotary evaporator brought to an operating pressure of 15 mbar and an operating temperautre of 55° C., Stage (1.2)

10 parts by weight of the solid-phase intermediate (IV) obtained in stage (1.1) were suspended in 50 parts by weight of n-heptane, a solution of 5 parts by weight of diethyl-aluminum chloride in 20 parts by weight of n-heptane was added to this suspension, and the resulting suspension was stirred for a short time at 50° C. The suspension was then filtered, and the residue was washed three times with n-heptane and dried under reduced pressure. Analysis of the resulting solid-phase product (VI), ie. the catalyst component (1), showed that it contained 0.0017 mole of transition metals per g.

Polymerization:

10 parts by weight of the transition metal catalyst component (1) (corresponding to 1 molar part of transition metals) were suspended in 3,000 parts by weight of n-heptane. The resulting suspension was introduced into a stirred autoclave which was charged with 70,000 parts by weight (corresponding to about 50% of its capacity) of n-heptane, 4,000 parts by weight of hex-1-ene and 120 parts by weight of triisobutyl-aluminum (2) ( corresponding to 36 molar parts). Polymerization was then carried out, while stirring, under the following conditions, which were kept constant by controlling them: ethylene pressure =27 bar, hydrogen pressure =2 bar and temperature=95° C. The polymerization was continued for 1.5 hours, after which it was terminated by letting down the pressure in the autoclave.

In this manner, a polymer was obtained which had relatively high rigidity, good processability and particularly high stress cracking resistance, the productivity being satisfactory.

We claim:

1. A process for the preparation of homopolymers and copolymers of $C_2$–$C_8$-α-monoolefins, by polymerization of the monomer or monomers at from 30 to 200° C., and under a pressure of from 0.1 to 200 bar, using a Ziegler catalyst system in the presence of hydrogen as a molecular weight regulator, comprising (1) a transition metal catalyst component and
(2) an organoaluminum catalyst component of the formula $$ALR_mX_{3-m}$$

where X is a radical OR, chlorine, bromine or hydrogen, R is a $C_1$–$C_{18}$-hydrocarbon radical and m is a number from 1 to 3, with the provisions (i) that the atomic ratio of the transition metal from the catalyst component (1) to aluminum from catalyst component (2) is from 1:0.1 to 1:500, and (ii) that the transition metal catalyst component (1) used is a solid-phase product (VI), obtained by a method in which (1.1) first (1.1.1) a finely divided, porous, inorganic oxidic substance (I), which has a particle diameter of from 1 to 1,000 μm, a pore volume of from 0.3 to 3 cm$^3$/g and a specific surface area of from 100 to 1,000 m$^2$/g and is of the formula $SiO_2.aAl_2O_3$-where a is a number from 0 to 2, and (1.1.2) a solution (II), as obtained on combining (IIa) 100 parts by weight of an alcohol of the formula $$Z-OH$$

where Z is a saturated $C_1$–$C_8$-hydrocarbon radical, and (IIb) from 0.01 to 40 parts by weight of a transition metal composition, are brought into contact with one another to form a suspension (III), with the proviso that the weight ratio of inorganic oxidic substance (I) to transition metal composition (IIb) is from 1:0.01 to 1:1.2, the suspension (III) is evaporated to dryness at below 200° C., and above the melting point of the alcohol (IIa) used, a solid-phase intermediate (IV) being formed, and (1.2) thereafter (1.2.1) the solid-phase intermediate (IV) obtained from stage (1.1) and (1.2.2) a solution, in an organic solvent, of an aluminum compound (V) of the formula $ALR_mX_{3-m}$ where X is a radical OR, chlorine, bromine or hydrogen, R is a $C_1$–$C_{18}$-hydrocarbon radical, and m is a number from 1 to 3, are brought into contact with one another to form a suspension, with the proviso that the weight ratio of the solid-phase intermediate (IV) to the aluminum compound (V) is from 1:0.05 to 1:2, and the resulting suspended solid-phase product (VI) is the transition metal catalyst component (1), wherein the transition metal catalyst component (1) employed is a solid-phase product obtained using a transition metal composition comprising (IIb1) 100 molar parts of a vanadium trihalide in which the halogen can be chlorine and/or bromine, (IIb2) from 0.5 to 300 molar parts of a titanium trihalide in which the halogen can be chlorine and/or bromine, and (IIb3) from 5 to 400 molar parts of a zirconium tetrahalide in which the halogen can be chlorine and/or bromine with the further proviso that the metal compound components of solid phase product (VI) are derived solely from substance (I) compound (V) and the transition metal compounds in composition (IIb).

2. The process of claim 1, wherein the molar ratio of the components (IIb1) to (IIb2) to (IIb3) in the transition metal composition (IIb) is 100:1 to 100:20 to 200.

* * * * *